United States Patent [19]

Stahl et al.

[11] Patent Number: 4,678,600
[45] Date of Patent: Jul. 7, 1987

[54] HEAT EXCHANGE REFORMING PROCESS AND REACTOR

[76] Inventors: Henrik O. Stahl, Fasanvaenget 514, DK-2980 Kokkedal; Jens R. Rostrup-Nielsen, Sondervej 74, DK-2830 Virum, both of Denmark

[21] Appl. No.: 841,251

[22] Filed: Mar. 19, 1986

[30] Foreign Application Priority Data

Mar. 21, 1985 [DK] Denmark ............................ 1266/85

[51] Int. Cl.$^4$ ................................................ C01B 3/32
[52] U.S. Cl. ..................................................... 252/373
[58] Field of Search ......................................... 252/373

[56] References Cited

U.S. PATENT DOCUMENTS 3,446,594  5/1969  Buswell et al. ..................... 252/373

Primary Examiner—Howard T. Mars
Attorney, Agent, or Firm—Ostrolenk, Faber, Gerb & Soffen

[57] ABSTRACT

An improved heat utilization in catalytic steam reforming of hydrocarbons to form a product stream rich in hydrogen is obtained by (a) first passing the process gas through a first portion comprising 25–75% of the steam reforming catalyst, whereby the heat needed for the endothermic reactions during reforming and for heating the process gas is supplied partly from a moderately hot flue gas and partly from the product stream; after which (b) the partly reformed process gas is passed through the remaining portion of the reforming catalyst, the heat needed for the further endothermic reactions and for heating the process gas is supplied by a hot flue gas generated by combustion of a fluid fuel, the hot flue gas being thereby cooled to form the moderately hot flue gas mentioned under (a). A reactor for use in this process is also described.

5 Claims, 3 Drawing Figures

HEAT EXCHANGE REFORMING PROCESS AND REACTOR

FIELD OF THE INVENTION

The present invention relates to a process for steam reforming of hydrocarbons in the presence of a catalyst and a reactor for carrying out this process. In particular, this invention relates to a process in which heat from the product stream of reformed gas is utilized to supply part of the heat required for the endothermic reforming reactions occurring in the process gas by indirect heat exchange between the product stream and the process gas.

BACKGROUND OF THE INVENTION

The endothermic reactions, occurring in a process for steam hydrocarbon reforming can be described by the following reaction schemes:

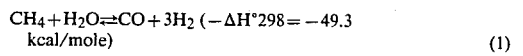

$$CH_4 + H_2O \rightleftharpoons CO + 3H_2 \quad (-\Delta H°298 = -49.3 \text{ kcal/mole}) \quad (1)$$

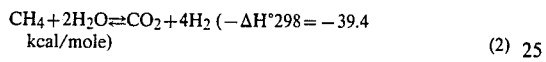

$$CH_4 + 2H_2O \rightleftharpoons CO_2 + 4H_2 \quad (-\Delta H°298 = -39.4 \text{ kcal/mole}) \quad (2)$$

Corresponding reaction schemes can be established for steam reforming of hydrocarbons higher than methane. These steam reforming reactions occur in the process gas of hydrocarbons and steam being passed through a steam reforming catalyst at steam reforming conditions. The necessary heat for the endothermic reactions is usually supplied by combustion in a radiant furnace chamber in which the catalyst is arranged in vertical tubes extending through the furnace chamber.

It is known to utilize the heat of the product stream of reformed gas as a partial source of heat. Such a process is described in U.S. Pat. No. 4,079,017 according to which a first portion of the process gas is subjected to steam hydrocarbon reforming in a conventional radiant chamber, while a second portion of the process gas is subjected to steam reforming by indirect heat exchange with a product stream. The two portions of process gas is thereafter combined and subjected to further steam hydrocarbon reforming in a secondary reforming process in the presence of air to supply heat by internal combustion in the process gas. The product stream from the secondary reforming process serves as heat exchange medium for heating the second portion of process gas.

It is an object of the present invention to provide a process for steam hydrocarbon reforming in which heat from the product stream is utilized in a more economic way in combination with heat from a hot flue gas generated by combustion in a burner. It is another object of the present invention to provide a reactor for carrying out the process of the present invention.

BRIEF DESCRIPTION OF THE INVENTION

Accordingly, the present invention is directed to a process for steam hydrocarbon reforming carried out by forming a feed stream comprising a hydrocarbon feed and steam and passing the feed stream as process gas at steam reforming conditions through a given volume of steam reforming catalyst for being converted to a product stream rich in hydrogen. According to the process of the present invention, the heat required for the endothermic reactions occurring in the process gas and for heating the process gas is supplied in two different ways as follows:

(a) While the process gas is passing through a first portion of the steam reforming catalyst constituting 25% to 75% of the total volume, the heat is supplied partly from a moderately hot flue gas as hereinafter defined and partly from the product stream.

(b) While the process gas is subsequently passing through a final portion of the steam reforming catalyst constituing the remainder of the total volume, the heat is supplied from a hot flue gas which has been generated by combustion of a fluid fuel and which is thereby being cooled to form the moderately hot flue gas as mentioned under above point (a).

An essential feature of the process of the present invention relates to the supply of heat required for the endothermic reactions. We have found a more economic method for supplying this heat by indirect heat exchange under utilization of heat from the product stream in combination with heat from a hot flue gas. According to this method, the heat exchange is achieved by performing the process of the invention in such a manner that the moderately hot flue gas and the product stream supplying the heat to the process gas in step (a) above, are passing separately and counter-currently in indirect heat exchange contact with the process gas passing step (a), whereas the hot flue gas supplying the heat to the process gas in step (b) above is passing co-currently in indirect heat exchange contact with the process gas passing step (b) to form the product stream. The process of the invention will be described in more detail below. However, in order to provide the basis for a better understanding of the problems related thereto, other features of the process will first be briefly outlined. These other features are related to the steam reforming conditions which, in general, are common for the process of the present invention and conventional steam reforming processes. These common steam reforming conditions are described below.

DETAILED DESCRIPTION OF THE INVENTION

The hydrocarbon feed for forming the feed stream for the process may be any hydrocarbon, hydrocarbon fraction, or mixture of hydrocarbons generally used as feed for steam hydrocarbon reforming. Typical feeds are natural gas, refinery off-gases, liquified petroleum gas, and various naphtha fractions such as light petroleum distillates. In order to be suitable as feed for steam reforming, the hydrocarbon feed will have to be subjected to desulphurization during which its total sulphur content is reduced to below 1 wt.ppm.

Steam is added to the hydrocarbon feed in an amount to provide a steam to carbon ratio in the feed stream sufficiently high to prevent formation of carbon when the feed stream as process gas is contacted with the steam reforming catalyst. Here and in the following, the steam to carbon ratio will be expressed as the number of steam molecules per carbon atoms. Normally, the minimum steam to carbon ratio will be 1.1. However, in order to ensure a reasonable conversion of the hydrocarbons to hydrogen and carbon oxides, the steam to carbon ratio will typically be between 1.5 and 7.0, preferably 2.0 to 4.5. In some cases, carbon dioxide may be added together with steam. In such cases, the steam to carbon ratio will be adjusted to take into account also the presence of carbon dioxide.

The steam reforming catalyst for the process according to the present invention may be any conventional steam reforming catalyst used in conventional steam reforming processes. The catalytically active component of such catalysts typically is metallic nickel. The nickel is deposited on a ceramic carrier material. Typical examples of carrier materials are alumina, spinel, magnesia, alumina-silica, and a number of other refractory oxides and mixtures or combinations of refractory oxides. It is well known to add promoters to reforming catalysts in order to obtain improved properties for specific purposes. Examples of such promoters are alkali and alkaline earth metal oxides.

The steam reforming reactions occurring in the process gas will be initiated in contact with a steam reforming catalyst at temperatures above 350° C. The temperature of the feed stream at the inlet to the catalyst will typically be 350° to 550° C., preferably 400° to 475° C. Under special circumstances, it may be preferable to heat the feed stream to about 600° C. at the inlet to the catalyst. However, in order to ensure the desired degree of conversion of hydrocarbon to hydrogen and carbon oxides, the temperature of the process gas will have to be raised gradually during its passage through the catalyst. Normally, the process gas will leave the catalyst as a product stream at 750°–950° C., preferably 800°–900° C. Accordingly, supply of heat is required, partly for the endothermic reactions, and partly for raising the temperature of the process gas from the inlet temperature of 350° to 600° C. of the feed stream to the outlet temperature of 750°–950° C. of the product stream. For this purpose, the steam reforming catalyst will have to be arranged in compartments suitable for receiving the necessary heat by heat transfer through the walls of these compartments.

The volume of catalyst required in a steam reforming process is normally determined according to two criteria: (1) The catalyst volume must be sufficient to ensure a residence time for the process gas as required for the desired conversion and (2) the catalyst volume must fill a catalyst compartment having sufficient external surface area as required for transfer of all heat necessary for the endothermic reactions and for heating the process gas. Since most steam reforming catalysts have a high activity, criterion (2) will normally be determining for selection of catalyst volume. The relation between catalyst volume and volume of process gas passing through the catalyst is normally expressed as space velocity in terms of $Nm^3$ of $C_1$ hydrocarbon per $m^3$ of catalyst volume per hour, where $C_1$ hydrocarbon means methane plus any higher hydrocarbons expressed as the equivalent of methane. In steam reforming processes, the space velocity is typically between 100 and 4,000, preferably between 200 and 2,000. Other considerations may, however, indicate a higher or lower space velocity.

For economic reasons, steam reforming processes are typically conducted at elevated pressures, such as 2–45 bar. Within this range, the operating pressure can be selected according to the pressures at which the product stream will be utilized or subjected to further processing, for instance 15–30 bar.

As previously mentioned, an essential feature of the process in accordance with the present invention relates to the supply of heat. This heat is primarily used for the endothermic reactions occurring while the process gas is passing through the steam reforming catalyst. Some heat is also used for heating the process gas from the temperature of the feed stream at the inlet of the catalyst to the temperature of the product stream at the outlet of the catalyst. The new method for supplying this heat will be described in detail below.

A part of the necessary heat is obtained by combustion of a fluid fuel, another part is obtained from the product stream. By a combination of heat from these two sources in accordance with the process of the present invention, a more economic utilization can be achieved.

The present invention also provides a reactor for carrying out a process for steam hydrocarbon reforming. This reactor is suitable for utilizing the method of supplying heat for the endothermic reactions and for heating the process gas as provided for by the process of the present invention.

Accordingly, the present invention provides a reactor for a process for steam hydrocarbon reforming carried out by forming a feed stream comprising a hydrocarbon feed and steam and passing the feed stream as a process gas at steam reforming conditions through a steam reforming catalyst for being converted to a product stream rich in hydrogen. This reactor according to the present invention comprises a pressure shell provided with a removable lid and inlets and outlets as hereinafter defined and includes in combination the following items:

(a) Catalyst compartments for holding a given volume of the steam reforming catalyst suitable for receiving through the compartment walls by indirect heat exchange necessary heat for heating the process gas and for endothermic reactions occurring in the process gas during its passage therethrough.

(b) Passageways for passing the feed stream from an inlet extending through the pressure shell to the catalyst compartments, and, as the process gas, further through a first portion of the volume constituting 25% to 75% thereof, and still further through a final portion of the volume constituting the remainder thereof.

(c) Passageways for passing the product stream from the final portion to and in indirect heat exchange contact with such part of the compartments which holds the first portion, for supply of heat from the product stream to the process gas passing therethrough and for further passing the product stream to an outlet through the pressure shell.

(d) Burner for generating a hot flue gas by combustion.

(e) Passageways for passing the hot flue gas from the burner to and in indirect heat exchange contact with such part of the compartments which holds the final portion, for supply of heat from the hot flue gas to the process gas passing therethrough and thereby being cooled to form a moderately hot flue gas.

(f) Passageways for passing the moderately hot flue gas to and in indirect heat exchange contact with such part of the compartments which holds the first portion, for supply of heat from the moderately hot flue gas to the process gas passing therethrough and thereby being cooled to form a cooled flue gas.

(g) Passageways for passing the cooled flue gas to an outlet extending through the pressure shell.

According to a preferred embodiment of the reactor, the passageways for passing the product stream from the second catalyst compartment in indirect heat exchange contact with the process gas passing the first catalyst compartment are adapted and positioned so as to direct the product stream counter-currently with the process gas passing the first catalyst compartment. In this way, the highest possible amount of heat is transferred from the product stream to the process gas before the product gas leaves the reactor.

According to the same preferred embodiment of the reactor, the passageways for passing flue gas in indirect heat exchange contact first with the process gas stream in the second catalyst compartment and then with the process gas stream in the first catalyst compartment are adapted and positioned so as to direct the hot flue gas co-currently with the process gas stream passing the second catalyst compartment and to direct the moderately hot flue gas counter-currently with the process gas stream passing the first catalyst compartment. In this way, the highest possible amount of heat is transferred from the flue gas to the process gas before the flue gas leaves the reactor. Counter-current heat exchange alone would not be suitable because of difficult control, uneven temperature distribution, and unacceptably high material temperatures and co-current flow alone would not be suitable either, as this would give rise to unacceptably high flue gas temperatures from an economic point of view.

The heat exchange reforming process and the reactor according to the invention are suitable for production of relatively small quantities of hydrogen. One example is local utilization of a minor local natural gas field. Another example is fulfilment of an incidental need of hydrogen, e.g. for generating electric power via a fuel cell or any other power unit. The above applications are possible due to the limited energy consumption and the reduced demand for heat exchange through external accessories.

Furthermore, the process and reactor of the invention may be used in a greater number at a particular site in order to fulfil a varying consumption of hydrogen, whether this is to be used for power generation or for the chemical industry. For all these applications, the start-up is facilitated because of the small size and the minor amount of energy to be entered render the reactor suitable for quick start to fulfil an immediate need of hydrogen for e.g. power production.

BRIEF DESCRIPTION OF THE DRAWINGS

For a better understanding of the process and reactor of the present invention specific embodiments thereof will now be described in more detail with reference to the the drawings and examples below.

In the drawings.

DETAILED DESCRIPTION OF A PREFERRED EMBODIMENT

Figure 1:
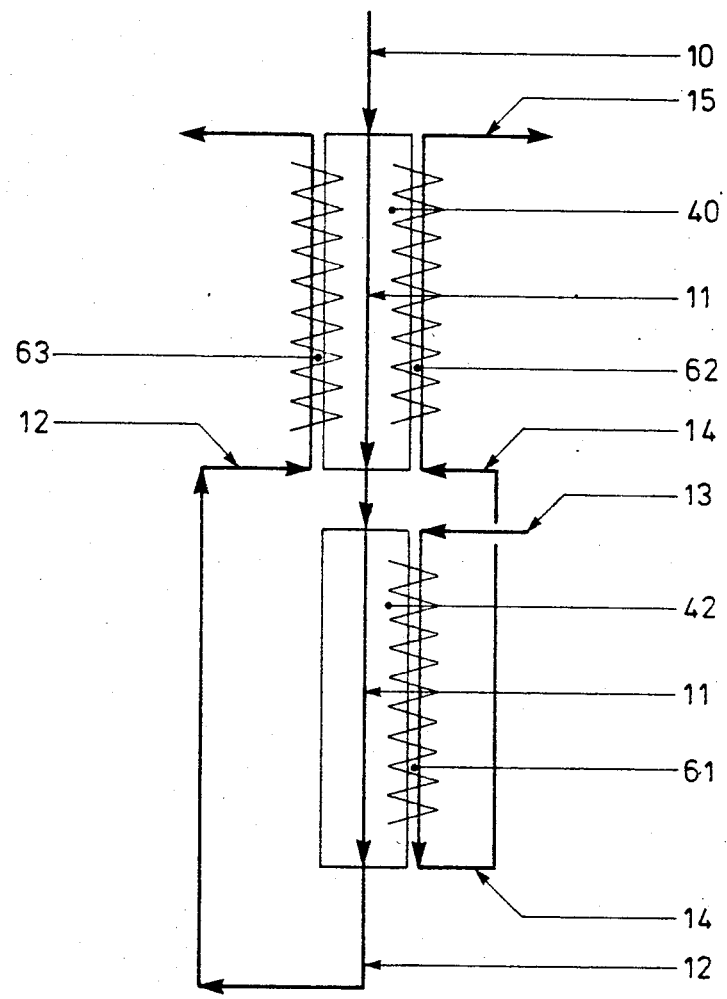
FIG. 1 shows a diagram of the process of the invention.

The principles of a preferred embodiment of the process of the present invention will briefly be described with reference to the diagram of FIG. 1.

A feed stream 10 is passed as a process gas 11 through a first portion of catalyst 40 and further through a second portion of catalyst 42. The process gas 11 leaves the second portion of catalyst 42 as a product stream 12. A hot flue gas 13 from a burner is passed along the second portion of catalyst 42 co-currently with and in indirect heat exchange contact 61 with the process gas 11 passing through the second portion of catalyst 42. By this indirect heat exchange and while being cooled, the hot flue gas 13 supplies the necessary heat for the endothermic reactions occurring in the process gas 11 passing through the second portion of catalyst 42 and for heating the process gas 11 to the temperature of the product stream 12. As a result, the hot flue gas 13 is cooled to form a moderately hot flue gas 14.

The moderately hot flue gas 14 after having supplied heat to the second portion of catalyst 42 is thereafter passed along the first portion of catalyst 40 counter-currently with and in indirect heat exchange contact 62 with the process gas 11 passing through the first portion of catalyst 40. By this indirect heat exchange and while being further cooled, the moderately hot flue gas 14 supplies part of the necessary heat for the endothermic reactions occurring in the process gas 11 passing through the first portion of catalyst 40 and for heating the process gas 11 to the temperature at the exit of the first portion of catalyst 40. As a result, the moderately hot flue gas 14 is cooled to form a cooled flue gas 15. The remaining part of heat is supplied from the product stream 12 which, like the moderately hot flue gas 14, is passed along the first portion of catalyst 40 counter-currently with and in indirect heat exchange contact 63 with the process gas 11.

The above described new method of supplying heat for the endothermic reactions occurring while the process gas passes through the catalyst is significantly different from known methods. Remaining steam reforming conditions for the process according to the present invention are, however, similar to and within the same ranges as applied in known steam reforming processes based on external heating. These steam reforming conditions have been described above.

Figure 2:
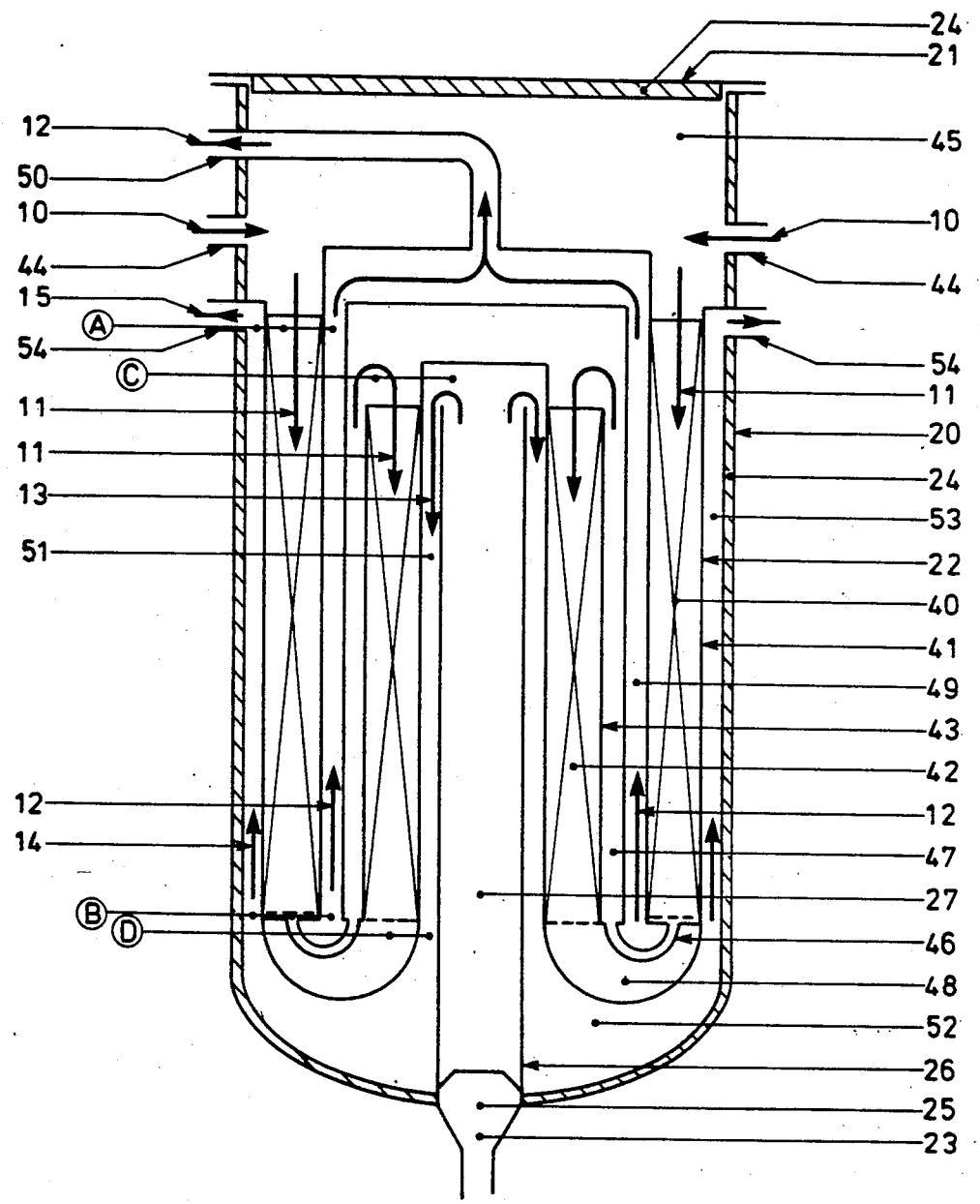
FIG. 2 shows an embodiment of a reactor according to the invention seen in a side view and as a longitudinal section along the vertical axis thereof.
Figure 3:
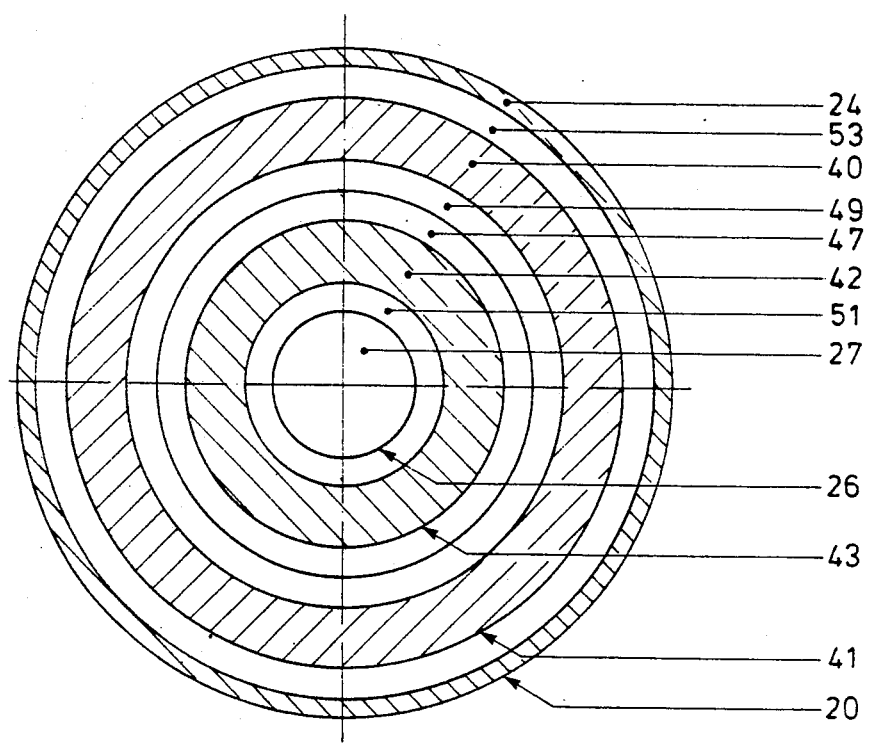
FIG. 3 shows a horizontal cross section of the reactor shown in FIG. 2.

In the drawings is also shown a specific embodiment of the reactor according to this invention. FIG. 2 is a longitudinal section of the reactor through its vertical axis. FIG. 3 is a horizontal cross section of the reactor. The reactor comprises a pressure shell 20 provided with a pressure lid 21 and inlets and outlets as further described below. Enclosed within the pressure shell are a catalyst basket 22 and a burner 23.

The pressure shell 20 and the lid 21 are internally provided with thermal insulation 24. When the lid 21 is removed, the pressure shell 20 has full bore opening at its upper end for easy installation and removal of the catalyst basket 22. The bottom of the pressure shell has an aperture for a burner 23.

The burner 23 is centrally mounted in the aperture and is in fixed and pressure-proof engagement with the pressure shell 20. The burner 23 comprises a combustion head 25 and a ceramic tube 26 forming a combustion chamber 27. The ceramic tube 26 is freely extending upwards without being engaged with the catalyst basket.

The catalyst basket 22 is composed of a number of concentrically positioned plates forming, in connection with appropriate walls, tubes, plates, and baffles, annular catalyst compartments and passageways for the feed stream 10, the process gas 11, the product stream 12, and the flue gas 13, 14, and 15.

The reactor described is arranged for two portions of catalyst. The first portion of catalyst 40 is contained in an outer annular catalyst compartment 41. The second portion of catalyst 42 is contained in an inner annular catalyst compartment 43. Inlets 44 for the feed stream 10 are located in the upper end of the pressure shell 20. Through these inlets, the feed stream 10 is passed into a top head 45 and further as the process gas 11 through the outer annular catalyst compartment 41. From the bottom of the outer annular catalyst compartment 41, the process gas 11 is communicated through a number of tubes 46 to an inner annular passageway 47 for being passed further through the inner annular catalyst compartment 43. The product stream 12 from the inner annular catalyst compartment 43 is collected in a semi-toroidal space 48 from where the product stream 12 is passed further through an outer annular passageway 49 to an outlet 50.

The passageways for the flue gas from the burner 23 comprise an inner annular flue gas duct 51 through which the hot flue gas 13 is passed from the combustion chamber 27 to a bottom head 52 and further as a moderately hot flue gas 14 through an outer annular flue gas duct 53 to outlets 54 as a cooled flue gas 15.

The inner annular flue gas duct 51 is arranged for providing indirect heat exchange for transfer of heat from the hot flue gas 13 to the process gas 11 in the inner annular catalyst compartment 43. Similarly, the outer annular flue gas duct 53 is arranged for providing indirect heat exchange for transfer of heat from the moderately hot flue gas 14 to the process gas 11 in the outer annular catalyst compartment 41. For further transfer of heat, the outer annular passageway 49 is arranged for providing indirect heat exchange for transfer of heat from the product stream 12 to the process gas 11 in the outer annular catalyst compartment 41.

For a proper functioning of the reactor, there are provisions for substantially avoiding transfer of heat through the annular sheet separating the outer annular passageway 49 from the inner annular passageway 47. Similarly, there are provisions for substantially avoiding transfer of heat through the wall of catalyst compartment 43 from the process gas 11 in inner annular passageway 47 to the process gas 11 in the catalyst inner annular compartment 43.

Details of means for providing for indirect heat exchange and for avoiding heat transfer as required according to the above explanation are not described nor indicated in the drawings. However, such means are well known in the art.

EXAMPLE

This example demonstrates how a specific embodiment of the process according to this invention can be carried out. The example is based on operating data derived on the basis of knowledge of kinetic data for the applicable steam reforming catalyst, heat transfer data, and other data related to conventional processes for steam hydrocarbon reforming. This embodiment of the process is conducted in the reactor shown in the drawings and will in the following be described in detail with reference to FIG. 2 and FIG. 3. A survey of the operating data is given in Table I and Table II. In Table I, the compositions, the pressures, and the temperatures of the various gas streams are related to various positions designated with capital letters as indicated in FIG. 2.

Two steam reforming catalysts are used in this example. Both types are commercially available Haldor Topsøe catalysts. A volume of 0.54 m$^3$ of a type designated RKNR is loaded as the first portion 40 in the outer annular catalyst compartment 41, while another volume of 0.30 m$^3$ of a type designated R-67 is loaded as the second portion 42 in the inner annular catalyst compartment 43.

The feed stream 10 is composed of 248 Nm$^3$/h of natural gas (95.06 mole % $CH_4$, 3.06 mole % $C_2H_6$, 0.46 mole % $C_3H_8$, 0.22 mole % $C_4H_{10}$, 0.46 mole % $N_2$, and 0.74 mole % $CO_2$) and 623 kg/h of steam. This volume of natural gas corresponds to 256 Nm$^3$ of $C_1$ hydrocarbon and a space velocity of 305 as hereinbefore defined. This corresponds to a steam to carbon ratio of 3.0 as hereinbefore defined. The feed stream 10 is heated to 427° C. and at a pressure of 5.85 kg/cm$^2$ g passed through the inlets 44 and as a process gas 11 through the catalyst contained in the catalyst compartments 41 and 43.

During its passage through the first portion 40 of catalyst in the outer annular catalyst compartment 41, the process gas 11 receives a total amount of heat of 414,400 kcal/h divided as 158,200 kcal/h from the product stream 12 passing through the outer annular passageway 49 and 256,200 kcal/h from the moderately hot flue gas 14 passing through the outer annular flue gas duct 53. This heat is utilized for the endothermic reactions amounting to a methane conversion of 56.34 and for heating the process gas to a temperature of 654° C. at the outlet of the outer annular catalyst compartment 41.

At the inlet to the inner catalyst compartment 43, the temperature of the process gas 11 increases to 664° C. During its further passage through the second portion 42 of catalyst in the inner annular catalyst compartment 43, the process gas 11 receives a further amount of heat of 312,000 kcal/h from the hot flue gas 13 passing through the inner annular flue gas duct 51. This heat is utilized for further endothermic reactions amounting to a further methane conversion of 37.01% and for heating the process gas 11 to a temperature of 805° C. at the outlet of the inner annular catalyst compartment 43. This process gas 11 is now rich in hydrogen which has been formed as the result of a total methane conversion of 93.35% and is passed as the product stream 12 through the outer annular passageway 49, where it supplies heat as mentioned above and thereby is cooled to a temperature of 537° C.

The hot flue 13 gas is generated at a pressure of 3.46 kg/cm$^2$ g in the combustion chamber 27 by combustion of 417 Nm$^3$/h of product gas (after removal of water) with 736 Nm$^3$/h of air to which is added 740 Nm$^3$/h of cooled flue gas recycled from the outlets 54. This recycle serves the purpose of reducing the temperature of the hot flue gas to 1,370° C. before it is contacted with the inner annular catalyst compartment 43. As mentioned above the hot flue gas 13 in an amount of 1,775 Nm$^3$/h passes through the inner annular flue gas duct 51, whereby it is cooled to 952° C. to form the moderately hot flue gas 14 and further through the outer annular flue gas duct 53, whereby it is further cooled to 587° C. at which temperature the cooled flue gas 15 leaves the reactor through the outlets 54. As mentioned above, a portion of the cooled flue gas 15 amounting to 41.65% is recycled to the burner 23.

As it appears from Table I below, the cooled flue gas 15 and the product stream 12 will leave the converter at a temperature of 587° C. and 537° C., respectively. In a conventional reformer furnace, the outlet temperature of the flue gas will be about 1,000° C. and the outlet temperature of the product gas will be about 800° C. Therefore, extensive heat recovery systems are required for obtaining a reasonable heat economy in a conventional reformer furnace.

TABLE I

| Position Stream | A Feed Stream 10 | B Process Gas 11 | C Process Gas 11 | D-B Product Stream 12 | A Product Stream 12 | C Flue Gas 13 | D-B Flue Gas 14 | A Flue Gas 15 |
|---|---|---|---|---|---|---|---|---|
| Gas composition: | | | | | | | | |
| $O_2$ kmol/h | 0.00 | 0.00 | 0.00 | 0.00 | 0.00 | 0.45 | 0.45 | 0.45 |
| $N_2$ kmol/h | 0.05 | 0.05 | 0.05 | 0.05 | 0.05 | 42.60 | 42.60 | 42.60 |
| Ar kmol/h | 0.00 | 0.00 | 0.00 | 0.00 | 0.00 | 0.51 | 0.51 | 0.51 |
| $H_2$ kmol/h | 0.00 | 23.12 | 23.12 | 35.44 | 35.44 | 0.00 | 0.00 | 0.00 |
| CO kmol/h | 0.00 | 2.17 | 2.17 | 6.79 | 6.79 | 0.00 | 0.00 | 0.00 |
| $CO_2$ kmol/h | 0.08 | 4.37 | 4.37 | 3.98 | 3.98 | 5.62 | 5.62 | 5.62 |
| $CH_4$* kmol/h | 11.43 | 4.99 | 4.99 | 0.76 | 0.76 | 0.00 | 0.00 | 0.00 |
| $H_2O$ kmol/h | 34.58 | 23.84 | 23.84 | 19.99 | 19.99 | 30.09 | 30.09 | 30.09 |
| Total kmol/h | 46.14 | 58.54 | 58.54 | 67.01 | 67.01 | 79.27 | 79.27 | 79.27 |
| Pressure, kg/cm²g | 5.85 | 5.69 | 5.69 | 5.22 | 5.22 | — | — | — |
| Temperature | 427 | 654 | 664 | 805 | 537 | 1.370 | 952 | 587 |

*including the equivalent of traces of higher hydrocarbons.

TABLE II

|  | First Portion of Catalyst | Second Portion of Catalyst | Total |
|---|---|---|---|
| Catalyst, m³ | 0.54 | 0.30 | 0.84 |
| $CH_4$* conversion, % | 56.34 | 37.01 | 93.35 |
| Heat, Kcal/h | 414,400 | 312,000 | 726,400 |
| Heat, % | 57.05 | 42.95 | 100.00 |

*including the equivalent of traces of higher hydrocarbons.

What is claimed is:

1. A process for the steam reforming in a reforming reactor of hydrocarbons by passing a feed stream comprising steam and one or more hydrocarbons as process gas at steam reforming conditions and under external supply of heat through a given volume of steam reforming catalyst to form a product stream rich in hydrogen, said process comprising
   (a) passing the process gas through a first portion of the steam reforming catalyst constituting 25–75% thereof, heat needed for the endothermic reactions occurring in the process gas and for heating the process gas being supplied partly from a moderately hot flue gas as defined under (b) and partly from the product stream, and
   (b) subsequently passing the process gas partly reformed in step (a) through the remaining portion of the steam reforming catalyst, the heat needed for the further endothermic reactions and heating of the process gas being supplied by a hot flue gas generated by combustion of a fluid fuel, the hot flue gas being hereby cooled to form the moderately hot flue gas employed in step (a).

2. A process according to claim 1, wherein the moderately hot flue gas and the product stream supplying the heat in step (a), are simultaneously and separately counter-currently in indirect heat exchange contact with the process gas passing step (a), whereas the hot flue gas supplying the heat to the process gas in step (b) is passing co-currently in indirect heat exchange contact with the process gas passing step (b) to form the product stream.

3. A process according to claim 1, wherein the steam reforming conditions comprise a steam to carbon ratio of the feed stream of 1.5 to 7.0, a temperature of the feed stream of 350° to 550° C., a temperature of the product stream of 750° to 950° C., when leaving said remaining portion, and a pressure of the process gas of 2 to 45 bar.

4. A process according to claim 3, wherein the hydrocarbon is natural gas and the steam to carbon ratio is 2.0 to 4.5.

5. A process according to claim 4, wherein the steam reforming conditions further comprise a space velocity of 100 to 4,000.

* * * * *